(12) United States Patent
Wu et al.

(10) Patent No.: US 8,767,887 B1
(45) Date of Patent: Jul. 1, 2014

(54) L1-NORM TRANSFORMATION IN SOFT-OUTPUT MIMO DETECTOR

(75) Inventors: Michael Wu, Palo Alto, CA (US); Christopher H. Dick, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 139 days.

(21) Appl. No.: 13/397,645

(22) Filed: Feb. 15, 2012

(51) Int. Cl.
*H04L 27/06* (2006.01)

(52) U.S. Cl.
USPC .......................................................... 375/341

(58) Field of Classification Search
USPC .................................... 375/341, 326; 714/786
See application file for complete search history.

(56) References Cited

U.S. PATENT DOCUMENTS

| | | | | |
|---|---|---|---|---|
| 8,442,105 B1 * | 5/2013 | Dick et al. | ..................... | 375/232 |
| 2009/0285332 A1 * | 11/2009 | Damen et al. | ................. | 375/299 |
| 2010/0031113 A1 * | 2/2010 | Chang et al. | .................. | 714/752 |
| 2010/0067597 A1 * | 3/2010 | Park et al. | ..................... | 375/262 |
| 2013/0089121 A1 * | 4/2013 | Koo et al. | ..................... | 375/150 |

* cited by examiner

*Primary Examiner* — Chieh M Fan
*Assistant Examiner* — Tanmay Shah
(74) *Attorney, Agent, or Firm* — Kevin T. Cuenot

(57) ABSTRACT

A method of processing a signal within a receiver can include generating, using the receiver, a candidate list including at least one entry for a signal. Each entry can include a candidate symbol vector and an L1-Norm error metric. The method can include, for each entry, generating an L1-Norm transformation from the L1-Norm error metric, wherein the L1-Norm transformation depends upon a function of a number of receiving antennas of the receiver. The signal can be decoded using the candidate list including the L1-Norm transformations.

20 Claims, 2 Drawing Sheets

L1-NORM TRANSFORMATION IN SOFT-OUTPUT MIMO DETECTOR

FIELD OF THE INVENTION

One or more embodiments disclosed within this specification relate to multiple-input, multiple-output (MIMO) wireless communication systems. More particularly, one or more embodiments relate to sphere detectors.

BACKGROUND

One type of wireless communication system relies upon an architecture in which multiple transmit antennas and multiple receive antennas are used. Such architectures are referred to as "multiple-input, multiple-output" or "MIMO" wireless systems. MIMO wireless systems have grown in popularity as such systems provide increased data throughput and increased range without an increase in bandwidth usage.

In general, a MIMO transmitter transmits a signal that includes more than one spatially multiplexed data stream. The number of data streams in the transmitted signal is equal to the number of transmit antennas used by the MIMO transmitter. Each data stream carries independent data. A MIMO receiver recovers each data stream. One type of MIMO receiver utilizes "sphere detection" to recover the data streams. Sphere detection is a class of near-maximum likelihood processing techniques for spatial multiplexing MIMO wireless systems. In general, sphere detection simplifies detection complexity typically involved in optimum maximum-likelihood detection techniques and provides comparable performance in terms of bit error rate (BER).

SUMMARY

One or more embodiments disclosed within this specification relate to multiple-input, multiple-output (MIMO) wireless communication systems and, more particularly, to sphere detectors.

An embodiment can include a method of processing a signal within a receiver. The method can include generating, using the receiver, a candidate list including at least one entry for the signal. Each entry can include a candidate symbol vector and an L1-Norm error metric. For each entry, an L1-Norm transformation can be generated from the L1-Norm error metric. The L1-Norm transformation can depend upon a function of a number of receiving antennas of the receiver. The method further can include decoding the signal using the candidate list including the L1-Norm transformations.

Another embodiment can include a receiver. The receiver can include a sphere detector. The sphere detector can include a sphere detection module configured to generate a candidate list including at least one entry for a signal. Each entry can include a candidate symbol vector and an L1-Norm error metric. The sphere detector also can include a transformation module configured to generate an L1-Norm transformation from the L1-Norm error metric for each entry. The L1-Norm transformation can depend upon a function of a number of receiving antennas of the receiver. The sphere detector further can include a log-likelihood ratio module configured to decode the signal using the candidate list including the L1-Norm transformations.

Another embodiment can include a non-transitory computer-readable medium having instructions which, when executed on a computer, perform a method. The method can include generating a candidate list including at least one entry for a signal. Each entry can include a candidate symbol vector and an L1-Norm error metric. The method also can include generating an L1-Norm transformation from the L1-Norm error metric for each entry, wherein the L1-Norm transformation depends upon a function of a number of receiving antennas of the receiver. The method further can include decoding the signal using the candidate list including the L1-Norm transformations.

DETAILED DESCRIPTION OF THE DRAWINGS

While the specification concludes with claims defining features of one or more embodiments that are regarded as novel, it is believed that the one or more embodiments will be better understood from a consideration of the description in conjunction with the drawings. As required, one or more detailed embodiments are disclosed within this specification. It should be appreciated, however, that the one or more embodiments are merely exemplary. Therefore, specific structural and functional details disclosed within this specification are not to be interpreted as limiting, but merely as a basis for the claims and as a representative basis for teaching one skilled in the art to variously employ the one or more embodiments in virtually any appropriately detailed structure. Further, the terms and phrases used herein are not intended to be limiting, but rather to provide an understandable description of the one or more embodiments disclosed herein.

One or more embodiments disclosed within this specification relate to multiple-input, multiple-output (MIMO) wireless communication systems and, more particularly, to sphere detectors. In accordance with the one or more embodiments disclosed within this specification, a MIMO receiver can be configured to include a MIMO detector. The MIMO detector can be implemented as a sphere detector configured to decode a signal that includes two or more independent data streams.

In decoding the signal, an L1-Norm transformation can be used. By using an L1-Norm transformation, the sphere detector can achieve performance that approaches that of a sphere detector that utilizes an L2-Norm for purposes of decoding, but with less complexity and computational expense. The reduction in complexity and computational expense translates into less complicated and/or more compact physical implementations in terms of the circuitry used.

In some cases, the L1-Norm is referred to as the Least Absolute Values method. The L2-Norm can be referred to as the Least Squares Method. In general, using the L1-Norm, even applying the transform described within this specification, in lieu of the L2-Norm, results in a receiver that requires a fewer multiplication operations for decoding received signals, thereby reducing complexity as described.

Figure 1:
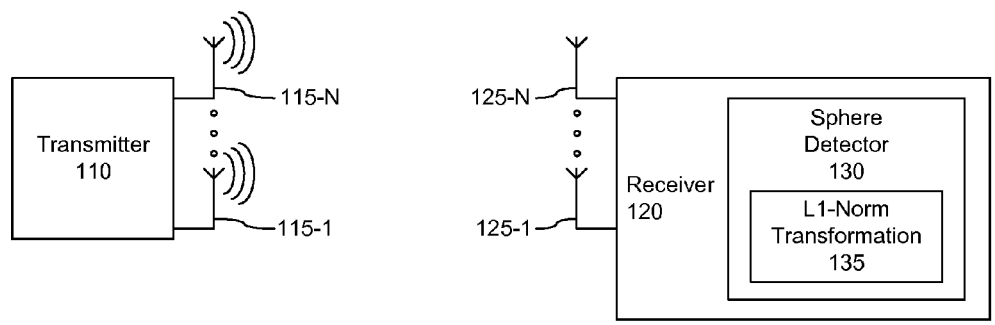
FIG. 1 is a block diagram illustrating a Multiple-Input, Multiple-Output (MIMO) system in accordance with one or more embodiments disclosed within this specification.

FIG. 1 is a block diagram illustrating a MIMO wireless system (MIMO system) 100 in accordance with an embodiment disclosed within this specification. MIMO system 100 can include a transmitter 110 and a receiver 120. As shown, transmitter 110 can include a plurality of antennas 115-1 through 115-N, where "N" represents an integer number. Similarly, receiver 120 can include two or more receiving antennas 125-1 through 125-N.

For purposes of illustration, MIMO system 100 is shown to have the same number of transmitting antennas as receiving antennas. The number of transmitting antennas need not match the number of receiving antennas. The one or more embodiments disclosed within this specification can be utilized in MIMO systems in which the number of transmitting antennas equals the number of receiving antennas or in MIMO systems in which the number of transmitting antennas is less than the number of receiving antennas.

In general, each transmitting antenna 115 can send one of the independent data streams included in the signal that is received by receiver 120 and is to be decoded. Receiver 120 can include a sphere detector 130 that is configured to decode the signal received from transmitter 110. As shown, sphere detector 130 can be configured to utilize a transformed version of the L1-Norm denoted as "L1-Norm transformation 135" in FIG. 1 when decoding the multiple independent data streams received from transmitter 110.

MIMO system 100 can be represented mathematically as an $N_r \times N_t$ type of MIMO system in which transmitter 110 transmits $N_t$ signals (over $N_t$ transmitting antennas) and receiver 120 receives signals on $N_r$ antennas. The received signal can be represented as $y=[y_0, y_1, \ldots, y_{N_r-1}]$ and can be modeled according to equation (1) below.

$$y = Hs_C + n \qquad (0)$$

Within equation (1), $H=[h_0, h_1, \ldots, h_{N_t-1}]$ is the $N_r \times N_t$ channel matrix, $s_C$ represents the transmit signal constellation vector, and n represents noise in receiver 120. Referring to equation (1), each element, $h_{ij}$, is an independent and identically distributed (i.d.d.) zero mean circular symmetric complex Gaussian random variable (ZMCSCG) with $\sigma_n^2$ variance. Given a binary vector $x=[x_0, x_1, x_2 \ldots x_{L-1}]$, where $L=\log_2 M \cdot N_t$, the function map(·) can translate the binary vector x onto $s_C =[s_0, s_1, \ldots, s_{N_t-1}]$. Each element of $s_C$, $s_i$, is an element drawn from a finite alphabet $\Omega$ with cardinality M and average power $E_s$ per symbol. For example, the constellation alphabet for QPSK is $\{-1-j, -1+j, 1-j, 1+j\}$ with M=4. The receiver noise $n=[n_0, n_1, \ldots, n_{N_r-1}]$ is an independent ZMCSCG with $\sigma_n^2/2$ variance per dimension.

Real-valued decomposition can be performed to derive an equivalent system model in the real domain. The resulting system model is represented by equation (2) below.

$$\begin{pmatrix} \Re(y) \\ \Im(y) \end{pmatrix} = \begin{pmatrix} \Re(H) & -\Im(H) \\ \Im(H) & \Re(H) \end{pmatrix} \begin{pmatrix} \Re(s_C) \\ \Im(s_C) \end{pmatrix} + \begin{pmatrix} \Re(n) \\ \Im(n) \end{pmatrix} \qquad (0)$$

To ensure the in-phase and the quadrature parts of the same complex symbol are adjacent neighbors, the real-value decomposed channel matrix can be permuted as illustrated below in equations (3) and (4).

$$\begin{pmatrix} \Re(y_0) \\ \Im(y_0) \\ \Re(y_1) \\ \Im(y_1) \\ \vdots \\ \Re(y_{N_R-1}) \\ \Im(y_{N_R-1}) \end{pmatrix} = \tilde{H} \begin{pmatrix} \Re(s_0) \\ \Im(s_0) \\ \Re(s_1) \\ \Im(s_1) \\ \vdots \\ \Re(s_{N_R-1}) \\ \Im(s_{N_R-1}) \end{pmatrix} + \begin{pmatrix} \Re(n_0) \\ \Im(n_0) \\ \Re(n_1) \\ \Im(n_1) \\ \vdots \\ \Re(n_{N_R-1}) \\ \Im(n_{N_R-1}) \end{pmatrix} \qquad (0)$$

$$y = \tilde{H}s + \tilde{n} \qquad (0)$$

After modified real-value decomposition, the number of elements in each vector is doubled and both dimensions of $\tilde{H}$ are doubled. Each element of the equivalent transmit vector, $\hat{s}_i$, is an element drawn from a finite alphabet $\Omega'$ with cardinality $Q=\sqrt{M}$. For example, the real value decomposed constellation alphabet for QPSK is $\{-1,1\}$ and Q=2.

$\tilde{H}$ can be decomposed through a process called QR decomposition into a product of two other matrices conventionally denoted as Q and R. Q is a unitary or orthogonal matrix and R is an upper triangular matrix. Thus, given y and H, QR decomposition on H for an equivalent system model can be performed as illustrated below.

$$\tilde{y} = \tilde{H}s + \tilde{n}$$

$$Q^T y = Rs + Q^T \tilde{n}$$

$$\hat{y} = Rs + \hat{n}$$

Given R and s, the probability density function $p(\hat{y}|R, s)$ can be defined by equation (5) below.

$$p(\hat{y} \mid R, s) = \frac{1}{(2\pi\sigma_n^2)^N} \cdot \exp\left(-\frac{\|\hat{y} - Rs\|_2^2}{2\sigma_n^2}\right) \qquad (0)$$

The L2-norm can be represented as $d(s)_2$ and defined as $d(s)_2 = \|\hat{y} - Rs\|_2^2$. Referring to equation (0), it can be seen that the probability density function is a function of the L2-Norm squared. Conventional sphere detectors utilize an error metric that is a function of the L2-Norm squared. To reduce complexity of sphere detector 130, the L1-Norm, represented as $d(s)_1$ and defined as $d(s)_1 = \|\hat{y} - Rs\|_1$, can be used instead of the L2-norm during the search process. As a result, each candidate in the generated candidate list is a transmit vector having an associated error metric which can be the L1-Norm distance. Using the L1-Norm in a Log-Likelihood Ratio (LLR) computation, however, can lead to performance degradation since $p(\hat{y}|R, s)$ is not a function of L1-Norm.

In accordance with one or more embodiments disclosed within this specification, receiver 120 and, more particularly, sphere detector 130, can utilize L1-Norm transformation 135 in place of other measures of Euclidean distance typically used within a sphere detector as the error metric, e.g., in lieu of the L2-Norm squared. Given an L1-Norm that can be computed by sphere detector 130, the computed distance or error metric, e.g., the L1-Norm, can be transformed resulting in L1-Norm transformation 135 to obtain a more accurate distance metric, thereby improving performance.

In one example, the transformation applied to the L1-Norm can include a squaring operation and a scaling operation. It should be appreciated that despite the squaring operation and scaling operation applied in determining L1-Norm transformation 135, the net number of multiplication operations required is reduced by a non-trivial number compared to the L2-Norm case, thereby reducing complexity of receiver 120 and reducing the circuitry required for performing the computations.

In one aspect, the squared version of the L1-Norm can be scaled using expected value scaling. Expected value scaling relies upon the premise that the expected value of the squared and scaled L1-Norm (e.g., L1-Norm transformation 135) will be the same as the expected value of the Euclidean distance, which is expressed below in equation (6).

$$\mathbb{E}[d(s)_2] = \gamma \mathbb{E}[(d(s)_1)^2] \quad (6)$$

In equation (6), $\gamma$ represents the scaling factor that can be used for expected value scaling, e.g., the expected value scaling factor. Equation (6) can be rewritten as equation (7) below.

$$\gamma = \frac{\mathbb{E}[d(s)_2]}{\mathbb{E}[(d(s)_1)^2]} \quad (7)$$

In equation (7), $\gamma$ represents the ratio between the Euclidian distance and the L1-Norm squared. In solving for $\gamma$, the expression $\mathbb{E}[d(s)_2]$ must be solved as illustrated below.

$$\begin{aligned}\mathbb{E}[d(s)_2] &= \mathbb{E}\left[(Q^T y - Rs)^T (Q^T y - Rs)\right] \\ &= \mathbb{E}\left[(Q^T \tilde{n})^T (Q^T \tilde{n})\right] \\ &= \mathbb{E}[\tilde{n}^T Q^T Q \tilde{n}] \\ &= \mathbb{E}[\tilde{n}^T \tilde{n}] \\ &= \sum_{i=0}^{N_r} \mathbb{E}[n_i n_i] \\ &= N_r \sigma_n^2\end{aligned}$$

The expected value of the square of the L1-Norm also must be determined. The square of the L1-Norm can be written as illustrated in equation (8).

$$\mathbb{E}[(d(s)_1)^2] = \mathbb{E}\left[\left(\sum_{i=0}^{N_r} |q_i \tilde{n}|\right)^2\right] \quad (8)$$

where $q_i$ is a row of $Q^T$. The summation can be expanded as illustrated in equation (9).

$$\mathbb{E}\left[\left(\sum_{i=0}^{N_r} |q_i \tilde{n}|\right)^2\right] = \mathbb{E}\left[\left(\sum_{i=0}^{N_r} |q_i \tilde{n}||q_i \tilde{n}|\right)\right] + \mathbb{E}\left[\left(\sum_{i,j,i\neq j} |q_i \tilde{n}||q_j \tilde{n}|\right)\right] \quad (9)$$

Since $q_i \cdot q_j = 0 \; \forall i \neq j$, $q_i \tilde{n}$ is independent from $q_j \tilde{n}$. Given $q_i \cdot q_i = 1$, $q_i \tilde{n}$ is a zero mean Gaussian random variable with variance of $\sigma_n^2$. Therefore:

$$\begin{aligned}\mathbb{E}\left[\left(\sum_{i=0}^{N_r} |q_i \tilde{n}|\right)^2\right] &= \sum_{i=0}^{N_r} \mathbb{E}[n_i n_i] + \mathbb{E}\left[\left(\sum_{i,j,i\neq j} |n_i||n_j|\right)\right] \\ &= \sum_{i=0}^{N_r} \mathbb{E}[n_i n_i] + 2\binom{N_r}{2}\mathbb{E}[|n_i||n_j|]\end{aligned}$$

$$= N_r \sigma_n^2 + 2\binom{N_r}{2}\frac{2}{\pi}\sigma_n^2$$

From the foregoing, the expected value scaling factor can be rewritten as illustrated below in equations (10) and (11).

$$\gamma = \frac{N_r}{N_r + 2\binom{N_r}{2}\frac{2}{\pi}} \quad (10)$$

$$= \frac{1}{1 + (N_r - 1)\frac{2}{\pi}} \quad (11)$$

From equations 10 and 11, it can be seen that the distribution $q_i \tilde{n}$ is equivalent to the distribution $n_i$.

In another aspect, a minimum mean square error (MMSE) type of scaling can be used. For MMSE scaling, the scaling factor, referred to as the MMSE scaling factor, can be denoted as $\alpha$ and can be determined to minimize the mean square error between the L2-Norm squared and L1-Norm, which is expressed in equation (12) below.

$$\min_{\alpha,\beta} \mathbb{E}\left[(d(s)_2 - \alpha d(s)_1^2)^2\right] \quad (12)$$

To solve for $\alpha$ and $\beta$ in equation (12), the derivative with respect to $\alpha$ is zero. Therefore:

$$\frac{\partial}{\partial \alpha}\left(\mathbb{E}\left[(d(s)_2 - \alpha d(s)_1^2)^2\right]\right) = 0 \quad (13)$$

$$\alpha = \frac{\mathbb{E}[d(s)_1^2 d(s)_2]}{\mathbb{E}[d(s)_1^4]} \quad (14)$$

Since $d(s)_1 = (\Sigma_i |n_i|)$, the relationships below can be established.

$$\mathbb{E}[d(s)_1^2] = N_r \sigma_n^2 + N_r(N_r - 1)\frac{2}{\pi}\sigma_n^2$$

$$\mathbb{E}[d(s)_2] = N_r \sigma_n^2$$

$$\mathbb{E}[d(s)_1^4] =$$

$$\mathbb{E}\left[\sum_i n_i^4 + \sum_{i\neq j}|n_i|^3|n_j| + \sum_{i\neq j}|n_i|^2|n_j|^2 + \sum_{i\neq j\neq k}n_i^2|n_j||n_k| + i \neq j \neq$$

$$k \neq l |n_i||n_j||n_k||n_l| = N_r \mathbb{E}[n_i^4] + 4N_r(N_r - 1)(\mathbb{E}[|n_i|^3|n_j|]) +$$

$$6\binom{N_r}{2}(\mathbb{E}[|n_i|^2|n_j|^2]) + 12 \cdot \frac{N_r(N_r - 1)(N_r - 2)}{2}(\mathbb{E}[n_i^2|n_j||n_k|]) +$$

$$24\binom{N_r}{4}(\mathbb{E}[|n_i||n_j||n_k||n_l|]) =$$

$$N_r \cdot 3\sigma_n^4 + 4N_r(N_r - 1)\left(\sqrt{\frac{8}{\pi}}\sigma_n^3\right)\left(\sqrt{\frac{2}{\pi}}\sigma_n\right) + 6\binom{N_r}{2}\sigma_n^4 +$$

-continued $$6nN_r(N_r-1)(N_r-2)\sigma_n^2 \cdot \sigma_n^2 \frac{2}{\pi} + 24\binom{N_r}{4}\left(\sqrt{\frac{2}{\pi}}\sigma_n\right)^4 a =$$

$$\frac{N_r(4(N_r-3)(N_r-2)(N_r-1) + 4\pi(3N_r-2)(N_r-1) + 3\pi^2 N_r)\sigma_n^4}{(\pi^2)}$$

$$\mathbb{E}\left[d(s)_1^2 d(s)_2\right] = \mathbb{E}\left[\sum_i n_i^4 + \sum_{i \neq j} n_i^2 n_j^2 + 2\sum_{i \neq j} |n_i|^3 |n_j| + 2\sum_{i \neq j \neq k} n_i^2 |n_j||n_k|\right] =$$

$$N_r \mathbb{E}[n_i^4] + N_r(N_r-1)\mathbb{E}[n_i^2 n_j^2] +$$

$$2N_r(N_r-1)\mathbb{E}[|n_i|^3|n_j|] + 2N_r\binom{N_r-1}{2}\mathbb{E}[n_i^2|n_j||n_k|] =$$

$$N_r \cdot 3\sigma_n^4 + N_r(N_r-1)\sigma_n^4 + 2N_r(N_r-1)\left(\sqrt{\frac{8}{\pi}}\sigma_n^3\right)\left(\sqrt{\frac{2}{\pi}}\sigma_n\right) +$$

$$2N_r\binom{N_r-1}{2}\left(\sqrt{\frac{2}{\pi}}\sigma_n\right)^2 \sigma_n^2 = \frac{n(n+2)(2n+\pi-2)\sigma_n^4}{\pi}$$

Accordingly, the L1-Norm squared value can be scaled by a, which can be determined according to equations (15) and (16).

$$\alpha = \frac{\mathbb{E}[d(s)_1^2 d(s)_2]}{\mathbb{E}[d(s)_1^4]} \quad (15)$$

$$= \frac{N_r(N_r+2)(2N_r+\pi-2)\pi}{N_r(4(N_r-3)(N_r-2)(N_r-1) + 4\pi(3N_r-2)(N_r-1) + 3\pi^2 N_r)} \quad (16)$$

The expected scaling factor γ and the MMSE scaling factor α are close in value, but are determined using different expressions. Each of γ and α is a first order equation or expression that is dependent on the number of receiving antennas $N_r$ in receiver 120. Table 1 below illustrates example values for each of γ and α for various values of $N_r$.

TABLE 1

| $N_r$ | 4 | 6 | 8 | 10 | 12 | 14 | 16 |
|---|---|---|---|---|---|---|---|
| Expected Value | 0.3437 | 0.2391 | 0.1833 | 0.1486 | 0.1250 | 0.1078 | 0.0948 |
| MMSE | 0.3317 | 0.2321 | 0.1788 | 0.1455 | 0.1227 | 0.1060 | 0.0934 |

The quality of each respective scaling factor can be measured through numerical simulation. For example, given eight i.d.d. Gaussian unit variance random variables (which corresponds to a 4×4 MIMO receiver), the mean square error (MSE) and maximum relative error (MRE) for each scaling technique can be determined and compared to a test case in which the L1-Norm is used without any scaling.

As illustrated below in Table 2, the expected value scaling technique and the MMSE scaling technique generate similar results in terms of MSE and MRE. Table 2 illustrates that use of the L1-Norm without any scaling performs significantly worse than cases in which either MMSE scaling or expected value scaling is used. This difference suggests that using L1-Norm without applying the transform described within this specification does not provide a good approximation of the L2-norm squared approach. Using either of the L1-Norm transformations (e.g., where one uses the expected scaling factor γ and the other uses the MMSE scaling factor α) as described herein can achieve performance within 0.5 dB of a soft-output detector configured to use the L2-norm squared value.

TABLE 2

|  | Expected Value | MMSE | L1-Norm |
|---|---|---|---|
| MSE | 0.50444 | 0.49409 | 2.2017 |
| MRE | 0.68407 | 0.66023 | 4.3412 |

Figure 2:
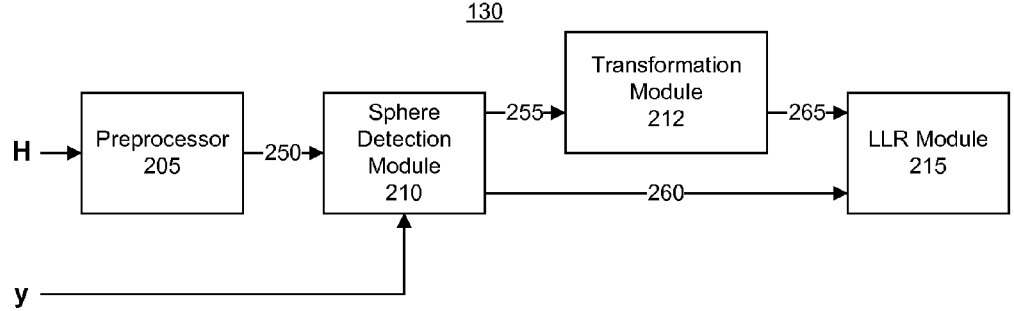
FIG. 2 is a block diagram illustrating a sphere detection module in accordance with another embodiment disclosed within this specification.

FIG. 2 is a block diagram illustrating sphere detector 130 of FIG. 1 in accordance with another embodiment disclosed within this specification. In general, sphere detector 130 can achieve similar BER performance with significantly reduced complexity compared to a full-complexity maximum likelihood (ML) detector. Sphere detector 130 can incorporate preprocessing and tree search algorithms to generate an approximation of the ML solution for each transmitted bit. As shown, sphere detector 130 can include a preprocessor 205, a sphere detection module 210, a transformation module 212, and an LLR module 215.

In an embodiment, one or more blocks, e.g., preprocessor 205, sphere detection module 210, transformation module 212, and/or LLR module 215, can be implemented as circuit blocks or circuitry that does not execute program code. The circuit blocks can be implemented as dedicated circuitry, for example, within an integrated circuit (IC) such as an application specific IC (ASIC).

In another example, one or more of the blocks of sphere detector 130 can be implemented using circuitry that is programmable as is the case in a programmable IC. One example of a programmable IC is a field programmable gate array (FPGA). An FPGA typically includes an array of programmable tiles. These programmable tiles can include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect circuitry and programmable logic circuitry. The programmable interconnect circuitry typically includes a large number of interconnect lines of varying lengths interconnected by programmable interconnect points (PIPs). The programmable logic circuitry implements the logic of a user design using programmable elements that can include, for example, function generators, registers, arithmetic logic, and so forth.

The programmable interconnect circuitry and programmable logic circuitry are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of programmable IC is the complex programmable logic device, or CPLD. A CPLD includes two or more "function blocks" connected together and to input/output (I/O) resources by an interconnect switch matrix. Each function block of the CPLD includes a two-level AND/OR structure similar to those used in programmable logic arrays (PLAs) and programmable array logic (PAL) devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable ICs, the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other programmable ICs are programmed by applying a processing layer, such as a metal layer, that programmably interconnects the various elements on the device. These programmable ICs are known as mask programmable devices. Programmable ICs can also be implemented in other ways, e.g., using fuse or antifuse technology. The phrase "programmable IC" can include, but is not limited to these devices and further can encompass devices that are only partially programmable. For example, one type of programmable IC includes a combination of hard-coded transistor logic and a programmable switch fabric that programmably interconnects the hard-coded transistor logic.

In another embodiment, sphere detector 130 can be implemented in the form of a processor that executes program code, e.g., a digital signal processor, a central processing unit, or the like. In one aspect, the processor that is used to implement sphere detector 130 can be embedded within an IC such as a programmable IC. The processor can be hardwired (e.g., a hard processor) in that the processor is fabricated as part of the IC or can be formed from programmable circuitry via the loading of configuration data (a soft processor). It should be appreciated, however, that sphere detector 130 also can be implemented using a mix of the circuit blocks and processors described.

As shown, preprocessor 205 can receive the channel matrix H as an input. Preprocessor 205 can calculate the decomposition of the channel matrix for each Orthogonal Frequency-Division Multiplexing (OFDM) subcarrier, i.e., each independent data stream transmitted from a transmitting antenna. Preprocessor 205 further can recalculate the operations as the channel realization changes.

In general, preprocessor 205 can be configured to decompose the channel matrix into an upper triangular matrix and an orthogonal matrix as previously described and output the result as signal 250 to sphere detection module 210. In this manner, preprocessor 205 effectively converts the lattice structure to a form that is more readily processed using a tree search algorithm. Any of a variety of different preprocessing techniques can be applied in transforming or decomposing the lattice.

Sphere detection module 210 is configured to receive signal 250 as input and the transmitted symbols, e.g., y. Sphere detection module 210 can be configured to determine the shortest path in the search tree received from preprocessor 205 given the transmitted symbols. Sphere detection module 210 can be configured to perform a tree search for each OFDM subcarrier, e.g., each independent data stream of the received signal, in the OFDM symbol interval. Sphere detection module 210 can generate a candidate list having one or more entries. Each entry can include a candidate symbol vector and an associated error metric. The error metric in each entry of the candidate list can be an L1-Norm as opposed to an L2-Norm.

As discussed, using L1-Norm as the error metric and applying the transform discussed reduces the number of multiply operations that must be performed. Consider the case in which an error metric is to be calculated for a candidate symbol vector s. Using the L2-Norm would utilize equation (5). Using the L1-Norm as set forth in equation (6), the number of multiplies required is reduced by two per level of the tree being traversed or searched. Given a four level search tree, e.g., four receiving antennas, the number of multiplication operations is reduced by eight. As noted, the L2-Norm, being the Least Squares Method, would be calculated generally according to $(a+bj)^2$. Since the value is complex, this translates into $(a^2+b^2)$.

By comparison, the L1-Norm, being the Least Absolute Values method, can be calculated generally according to $(|a|+|b|)$. Thus, even applying the transform described within this specification, a non-trivial reduction in the complexity of the calculation that is performed and the corresponding system can be achieved. Moreover, in the tree search process, multiple paths are routinely explored to find the best set of paths or candidates. Although there may be some common computations, the number of multiply operations needed for the exploration scales with the number of candidates being considered in parallel. Thus, the reduction in complexity that is achieved using the one or more embodiments disclosed within this specification is further enhanced over L2-Norm implementations.

In one aspect, sphere detection module 210 can output the candidate list in the form of signal 255 and signal 260. Signal 255, for example, can include the error metric corresponding to each of the candidate symbol vectors output in the form of signal 260. As shown, transformation module 212 can be configured to apply the transform described herein to the error metrics. For example, transformation module 212 can generate an L1-Norm transformation from each received L1-Norm. More particularly, transformation module 212 can square each received L1-Norm and then apply a scaling factor to the squared L1-Norm. Depending upon the particular implementation of transformation module 212, either the expected value scaling factor or the MMSE scaling factor can be used. The resulting L1-Norm transformations can be output as signal 265 to LLR module 215.

During transmission, the L1-Norms and the L1-Norm transformations can remain aligned with the correct candidate symbol vectors as the L1-Norm transformations propagate to LLR module 215. For example, an entry in the candidate list can include a first L1-Norm and a first candidate symbol vector. A first L1-Norm transformation can be generated from the first L1-Norm by transformation module 212. The first L1-Norm transformation can remain aligned or paired as an entry with the first candidate symbol vector as received by LLR module 215.

In any case, the resulting candidate list of entries, where each entry includes a candidate symbol vector and a corresponding L1-Norm transformation, can be provided to LLR module 215. It should be appreciated that while signal 260 is shown to bypass transformation module 212, in another embodiment, signal 260 can be provided to transformation module 212 and allowed to "pass through" transformation module 212 unaltered.

LLR module 215 can receive the candidate list including the L1-Norm transformations in the form of signal 260 and 265. LLR module 215 can be configured to perform the LLR calculation and calculate the soft outputs for each subcarrier in the OFDM symbol interval. The candidate list then can be used to calculate the soft output LLRs, i.e., the probabilistic soft information or likelihood value, for each transmitted bit.

Figure 3:
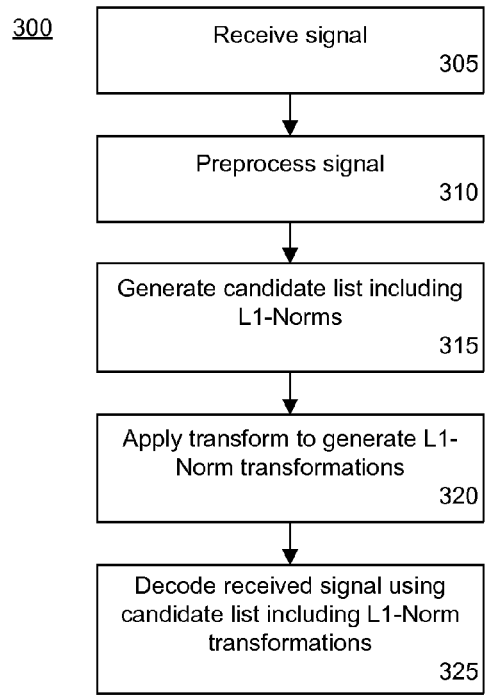
FIG. 3 is a flow chart illustrating a method of processing a signal within a MIMO system in accordance with another embodiment disclosed within this specification.

FIG. 3 is a flow chart illustrating a method 300 of processing a signal in accordance with another embodiment disclosed within this specification. Method 300 can be performed by a system such as the receiver illustrated with reference to FIGS. 1 and 2. For example, method 300 can be implemented by sphere detector 130 within receiver 120.

In block 305, a signal can be received by the system. The signal can include two or more independent data streams that require decoding. In step 310, the system can preprocess, e.g., decompose, the received signal. In block 315, the system can generate a candidate list including one or more entries for the signal. Each entry can include a candidate symbol vector and an associated error metric, i.e., an L1-Norm.

In block 320, the system can apply a transform to generate an L1-Norm transformation for each L1-Norm. In particular, each L1-Norm can be squared and multiplied by a selected scaling factor, e.g., either the expected value scaling factor or the MMSE scaling factor. Appreciably, since the scaling factor can be calculated as a first order function of the number of receiving antennas in the system, the scaling factor is unchanging given a fixed number of receiving antennas within the receiver. After block 320, the candidate list includes one or more entries where each entry includes a candidate symbol vector and corresponding L1-Norm transformation.

In step 325, the system can decode the received signal using the candidate list including the L1-Norm transformations and output the result. The system can calculate the soft output LLRs, i.e., the probabilistic soft information of the transmitted coded bits. As used herein, "outputting" and/or "output" can mean storing in memory elements, writing to display or other peripheral output device, sending or transmitting to another system, exporting, or the like.

Figure 4:
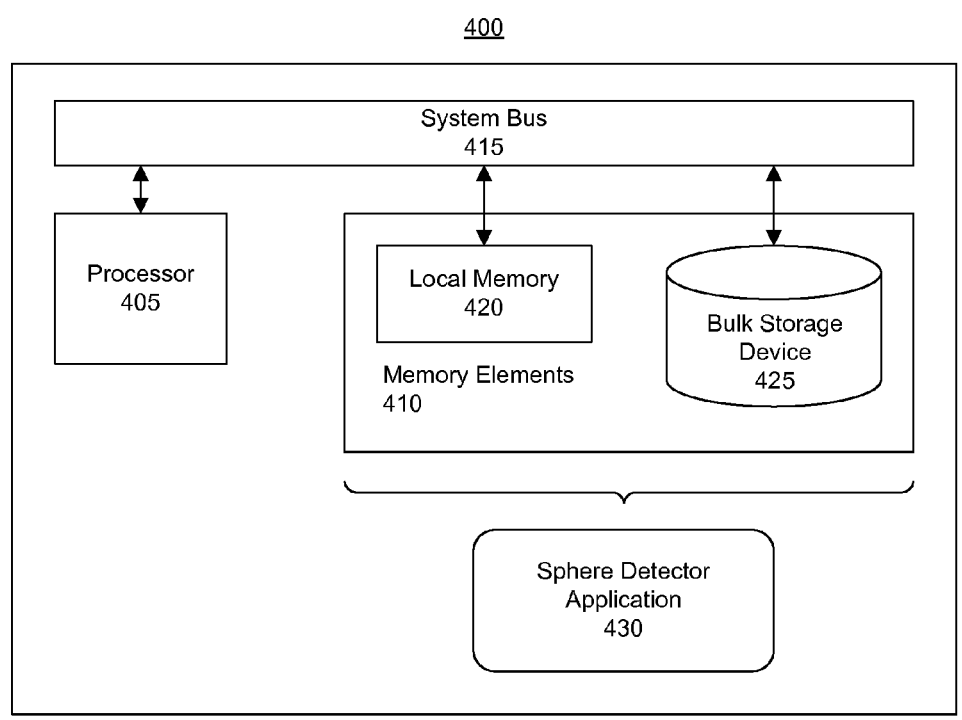
FIG. 4 is a block diagram illustrating a signal processing system in accordance with another embodiment disclosed within this specification.

FIG. 4 is a block diagram illustrating a system 400 for sphere detection in accordance with another embodiment disclosed within this specification. System 400 can include at least one processor 405 coupled to memory elements 410 through a system bus 415 or other suitable circuitry. As such, system 400 can store program code within memory elements 410. Processor 405 can execute the program code accessed from memory elements 410 via system bus 415 or other circuitry.

In one aspect, for example, system 400 can be implemented as a computer that is suitable for storing and/or executing program code. It should be appreciated, however, that system 400 can be implemented in the form of any system including a processor and memory that is capable of performing the functions described within this specification. For example, system 400 can be implemented in the form of a digital signal processing system, central processing unit, an embedded processor, etc.

Memory elements 410 can include one or more physical memory devices such as, for example, local memory 420 and one or more bulk storage devices 425. Local memory 420 refers to random access memory or other non-persistent memory device(s) generally used during actual execution of the program code. Bulk storage device(s) 425 can be implemented as a hard drive, flash memory, or other persistent data storage device. System 400 also can include one or more cache memories (not shown) that provide temporary storage of at least some program code in order to reduce the number of times program code must be retrieved from bulk storage device 425 during execution.

Input/output (I/O) devices such as a keyboard, a display, and a pointing device (not shown) optionally can be coupled to system 400. The I/O devices can be coupled to system 400 either directly or through intervening I/O controllers. Network adapters also can be coupled to system 400 to enable system 400 to become coupled to other systems, computer systems, remote printers, and/or remote storage devices through intervening private or public networks. Modems, cable modems, and Ethernet cards are examples of different types of network adapters that can be used with system 400.

As pictured in FIG. 4, memory elements 410 can store a sphere detector application 430. Sphere detector application 430, being implemented in the form of executable program code, can be executed by system 400. Sphere detector application 430 can perform the various functions described within this specification in terms of preprocessing a signal, determining a candidate list including L1-Norms as the error metric, generating the L1-Norm transformations, and/or using the candidate list with the L1-Norm transformations in decoding the received signal.

For purposes of explanation, specific nomenclature is set forth to provide a thorough understanding of the various concepts disclosed herein. The terminology used herein, however, is for the purpose of describing particular embodiments only and is not intended to be limiting. For example, reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The terms "a" and "an," as used herein, are defined as one or more than one. The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system.

The term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/ or groups thereof. It will also be understood that, although the terms first, second, etc. may be used herein to describe various elements, these elements should not be limited by these terms, as these terms are only used to distinguish one element from another.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Within this specification, the same reference characters are used to refer to terminals, signal lines, wires, and their corresponding signals. In this regard, the terms "signal," "wire," "connection," "terminal," and "pin" may be used interchangeably, from time-to-time, within this specification. It also should be appreciated that the terms "signal," "wire," or the like can represent one or more signals, e.g., the conveyance of a single bit through a single wire or the conveyance of multiple parallel bits through multiple parallel wires. Further, each wire or signal may represent bi-directional communication between two, or more, components connected by a signal or wire as the case may be.

One or more embodiments can be realized in hardware or a combination of hardware and software. One or more embodiments can be realized in a centralized fashion in one system or in a distributed fashion where different elements are spread across several interconnected systems. Any kind of data processing system or other apparatus adapted for carrying out at least a portion of the methods described herein is suited.

One or more embodiments further can be embedded in a computer program product, which comprises all the features enabling the implementation of the methods described herein. The computer program product can include a data storage medium, e.g., a non-transitory computer-usable or computer-readable medium, storing program code that, when loaded and executed in a system including memory and a processor causes the system to perform or initiate at least a portion of the functions described within this specification. In another example, the data storage medium can include program code in the form of a bitstream that, when loaded into a programmable IC, implements a circuit design specified by the bitstream within the programmable IC. Examples of data storage media can include, but are not limited to, optical media, magnetic media, magneto-optical media, computer memory such as random access memory, a bulk storage device, e.g., hard disk, or the like.

Accordingly, the flowchart and block diagrams in the figures illustrate the architecture, functionality, and operation of possible implementations of systems, methods and computer program products according to the one or more embodiments disclosed herein. In this regard, each block in the flowchart or block diagrams may represent a module, segment, or portion of code, which includes one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terms "computer program," "software," "application," "computer-usable program code," "program code," "executable code," variants and/or combinations thereof, in the present context, mean any expression, in any language, code or notation, of a set of instructions intended to cause a system having an information processing capability to perform a particular function either directly or after either or both of the following: a) conversion to another language, code, or notation; b) reproduction in a different material form. For example, program code can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

Thus, throughout this specification, statements utilizing terms such as "processing" or "computing" or "calculating" or "determining" or "displaying" or the like, refer to the action and processes of a data processing system, e.g., a computer system, or similar electronic computing device, that manipulates and transforms data represented as physical (electronic) quantities within the computer system's registers and/or memories into other data similarly represented as physical quantities within the computer system memories and/or registers or other such information storage, transmission or display devices.

The corresponding structures, materials, acts, and equivalents of all means or step plus function elements in the claims below are intended to include any structure, material, or act for performing the function in combination with other claimed elements as specifically claimed. The description of the one or more embodiments within this specification has been presented for purposes of illustration and description, but is not intended to be exhaustive or limiting to the form(s) disclosed. The one or more embodiments were chosen and described in order to best explain certain principles and the practical application of the principles, and to enable others of ordinary skill in the art to understand the one or more embodiments with various modifications as are suited to the particular use contemplated.

The one or more embodiments disclosed within this specification can be embodied in other forms without departing from the spirit or essential attributes thereof. Accordingly, reference should be made to the following claims, rather than to the foregoing specification, as indicating the scope of the one or more embodiments.

What is claimed is:

1. A method of processing a signal within a receiver, the method comprising:
   generating, using the receiver, a candidate list comprising at least one entry for the signal;
   wherein each entry comprises a candidate symbol vector and an L1-Norm error metric;
   for each entry, generating an L1-Norm transformation from the L1-Norm error metric;
   wherein the L1-Norm transformation depends upon a function of a number of receiving antennas of the receiver; and
   decoding the signal using the candidate list comprising the L1-Norm transformations.

2. The method of claim 1, further comprising:
   using the L1-Norm transformation in lieu of using an L2-Norm.

3. The method of claim 1, wherein the function is a first order function.

4. The method of claim 3, wherein the L1-Norm transformation is determined by squaring the L1-Norm error metric and multiplying the squared L1-Norm error metric by the function.

5. The method of claim 3, wherein the function comprises $$\frac{1}{1+(N_r-1)\frac{2}{\pi}};$$

wherein $N_r$ specifies the number of receiving antennas.

6. The method of claim 3, wherein the function comprises $$\frac{N_r(N_r+2)(2N_r+\pi-2)\pi}{N_r(4(N_r-3)(N_r-2)+4\pi(3N_r-2)(N_r-1)+3\pi^2 N_r)};$$

wherein $N_r$ specifies the number of receiving antennas.

7. The method of claim 1, wherein generating an L1-Norm transformation from the L1-Norm error metric further comprises:
squaring the L1-Norm error metric; and
scaling the squared L1-Norm error metric using the function.

8. A receiver, comprising:
a sphere detector comprising:
a sphere detection module configured to generate a candidate list comprising at least one entry for a signal;
wherein each entry comprises a candidate symbol vector and an L1-Norm error metric;
a transformation module configured to generate, for each entry, an L1-Norm transformation from the L1-Norm error metric;
wherein the L1-Norm transformation depends upon a function of a number of receiving antennas of the receiver; and
a log-likelihood ratio module configured to decode the signal using the candidate list comprising the L1-Norm transformations.

9. The system of claim 8, wherein the L1-Norm transformation is used in lieu of an L2-Norm.

10. The system of claim 8, wherein the function is a first order function.

11. The system of claim 10, where the L1-Norm transformation is determined by squaring the L1-Norm error metric and multiplying the squared L1-Norm error metric by the function.

12. The system of claim 10, wherein the function comprises $$\frac{1}{1+(N_r-1)\frac{2}{\pi}};$$

wherein $N_r$ specifies the number of receiving antennas.

13. The system of claim 10, wherein the function comprises $$\frac{N_r(N_r+2)(2N_r+\pi-2)\pi}{N_r(4(N_r-3)(N_r-2)+4\pi(3N_r-2)(N_r-1)+3\pi^2 N_r)};$$

and
wherein $N_r$ specifies the number of receiving antennas.

14. The system of claim 8, wherein the sphere detector is further configured to:
square the L1-Norm error metric; and
scale the squared L1-Norm error metric using the function.

15. A non-transitory computer-readable medium having instructions which when executed on a computer perform a method comprising:
generating a candidate list comprising at least one entry for a signal;
wherein each entry comprises a candidate symbol vector and an L1-Norm error metric;
for each entry, generating an L1-Norm transformation from the L1-Norm error metric;
wherein the L1-Norm transformation depends upon a function of a number of receiving antennas of the receiver; and
decoding the signal using the candidate list comprising the L1-Norm transformations.

16. The medium of claim 15, wherein the function is a first order function.

17. The medium of claim 15, wherein the L1-Norm transformation is determined by squaring the L1-Norm error metric and multiplying the squared L1-Norm error metric by the function.

18. The medium of claim 16, wherein the function comprises $$\frac{1}{1+(N_r-1)\frac{2}{\pi}};$$

wherein $N_r$ specifies the number of receiving antennas.

19. The medium of claim 16, wherein the function comprises $$\frac{N_r(N_r+2)(2N_r+\pi-2)\pi}{N_r(4(N_r-3)(N_r-2)+4\pi(3N_r-2)(N_r-1)+3\pi^2 N_r)};$$

wherein $N_r$ specifies the number of receiving antennas.

20. The medium of claim 15, wherein generating an L1-Norm transformation from the L1-Norm error metric further comprises:
squaring the L1-Norm error metric; and
scaling the squared L1-Norm error metric using the function.

* * * * *